United States Patent
Yukawa

(10) Patent No.: US 9,776,625 B2
(45) Date of Patent: Oct. 3, 2017

(54) VEHICLE DRIVE DEVICE

(71) Applicant: Panasonic Intellectual Property Management Co., Ltd., Osaka (JP)

(72) Inventor: Junichi Yukawa, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/115,238

(22) PCT Filed: Feb. 18, 2015

(86) PCT No.: PCT/JP2015/000753
§ 371 (c)(1),
(2) Date: Jul. 28, 2016

(87) PCT Pub. No.: WO2015/162834
PCT Pub. Date: Oct. 29, 2015

(65) Prior Publication Data
US 2017/0008512 A1  Jan. 12, 2017

(30) Foreign Application Priority Data

Apr. 22, 2014 (JP) ................. 2014-087929

(51) Int. Cl.
*B60L 9/00* (2006.01)
*B60L 11/00* (2006.01)
(Continued)

(52) U.S. Cl.
CPC ............... *B60W 20/19* (2016.01); *B60K 6/24* (2013.01); *B60K 6/26* (2013.01); *B60K 6/48* (2013.01);
(Continued)

(58) Field of Classification Search
CPC ...... B60W 20/19; B60W 10/06; B60W 10/02; B60W 10/08; B60W 10/30;
(Continued)

(56) References Cited

U.S. PATENT DOCUMENTS 5,028,803 A * 7/1991 Reynolds ............... F02N 11/04
290/31
2009/0145679 A1  6/2009 Simon et al.
(Continued)

FOREIGN PATENT DOCUMENTS

DE  102008057101 A1  6/2009
JP  2000-154729  6/2000
(Continued)

OTHER PUBLICATIONS

English Translation for WO2013061373A.*
(Continued)

*Primary Examiner* — Mahmoud Ismail
(74) *Attorney, Agent, or Firm* — McDermott Will & Emery LLP

(57) ABSTRACT

A vehicle drive device includes an engine configured to be mounted to a vehicle, a drive shaft mechanically connected to the engine as to drive the vehicle, a first power connecting-disconnecting unit connected to one of the drive shaft and the engine, a motor generator mechanically connected to the one of the drive shaft and the engine via the first power connecting-disconnecting unit, a second power connecting-disconnecting unit connected to the motor generator, and a supercharger mechanically connected to the motor generator via the second power connecting-disconnecting unit. The vehicle drive device can retrieve regenerative electric power efficiently.

1 Claim, 18 Drawing Sheets

(51) Int. Cl.
| | |
|---|---|
| *G05D 3/00* | (2006.01) |
| *G05D 1/00* | (2006.01) |
| *G06F 7/00* | (2006.01) |
| *G06F 17/00* | (2006.01) |
| *B60W 20/19* | (2016.01) |
| *B60K 6/24* | (2007.10) |
| *B60K 6/48* | (2007.10) |
| *B60L 11/14* | (2006.01) |
| *B60W 10/02* | (2006.01) |
| *F02D 23/00* | (2006.01) |
| *B60K 6/26* | (2007.10) |
| *B60W 10/06* | (2006.01) |
| *B60W 10/08* | (2006.01) |
| *B60W 10/30* | (2006.01) |
| *B60W 30/18* | (2012.01) |
| *B60W 20/00* | (2016.01) |
| *F02B 37/04* | (2006.01) |
| *F02B 39/10* | (2006.01) |
| *F02B 33/00* | (2006.01) |

(52) U.S. Cl.
CPC ............ *B60L 11/14* (2013.01); *B60W 10/02* (2013.01); *B60W 10/06* (2013.01); *B60W 10/08* (2013.01); *B60W 10/30* (2013.01); *B60W 30/18127* (2013.01); *F02D 23/00* (2013.01); *B60W 20/00* (2013.01); *B60Y 2200/92* (2013.01); *B60Y 2300/43* (2013.01); *B60Y 2300/51* (2013.01); *B60Y 2300/91* (2013.01); *F02B 33/00* (2013.01); *F02B 37/04* (2013.01); *F02B 39/10* (2013.01); *Y02T 10/144* (2013.01); *Y02T 10/6221* (2013.01); *Y02T 10/6295* (2013.01); *Y02T 10/7077* (2013.01); *Y10S 903/93* (2013.01)

(58) Field of Classification Search
CPC ..... B60W 30/18127; B60K 6/24; B60K 6/26; B60K 6/48; B60L 11/14; F02D 23/00
USPC .......................................................... 701/22
See application file for complete search history.

(56) References Cited

U.S. PATENT DOCUMENTS

| | | |
|---|---|---|
| 2010/0275890 A1 | 11/2010 | Mcdonald-Walker |
| 2012/0137681 A1 | 6/2012 | Hoess et al. |

FOREIGN PATENT DOCUMENTS

| | | | | |
|---|---|---|---|---|
| JP | 2001-323818 | | 11/2001 | |
| JP | 2005-299797 | | 10/2005 | |
| JP | 2005299797 A | * | 10/2005 | |
| JP | 2010-500506 | | 1/2010 | |
| JP | 2012-092708 | | 5/2012 | |
| JP | 2012-530876 | | 12/2012 | |
| JP | WO 2013061373 A1 | * | 5/2013 | ............ B60K 6/383 |
| JP | 2013-181393 | | 9/2013 | |
| JP | 2014-194209 | | 5/2015 | |
| WO | 2011/009693 A1 | | 1/2011 | |
| WO | 2013/004595 A1 | | 1/2013 | |

OTHER PUBLICATIONS

English Translation for JP2005299797A.*
International Search Report of PCT application No. PCT/JP2015/000753 dated May 19, 2015.
The Extended European Search Report dated Apr. 10, 2017 for the related European Patent Application No. 15782445.9.

* cited by examiner

VEHICLE DRIVE DEVICE

CROSS-REFERENCE TO RELATED APPLICATIONS

This application is a U.S. national stage application of the PCT International Application No. PCT/JP2015/000753 filed on Feb. 18, 2015, which claims the benefit of foreign priority of Japanese patent application 2014-087929 filed on Apr. 22, 2014, the contents all of which are incorporated herein by reference.

TECHNICAL FIELD

The present invention relates to a vehicle drive device using an electric supercharger as a supercharger.

BACKGROUND ART

FIG. 18 is a detailed view of a vehicle drive device using a conventional supercharger system disclosed in PTL 1.

In FIG. 18, from an upstream side, compressor 105 of turbocharger 103, first intercooler 107, first valve 109, supercharger 111, and second intercooler 113 are arranged in an intake passage of engine 101. A downstream side of the intake passage is connected to intake manifold 115 of engine 101. An upstream side of first intercooler 107 and a downstream side of supercharger 111 are connected via a bypass passage. Second valve 117 is interposed in the bypass passage.

Intermediate shaft 125 is connected via supercharger clutch 123 to first drive shaft 121 protruding from screw 119 located on one side of supercharger 111. Crankshaft 129 (drive shaft) of engine 101 is coupled with intermediate shaft 125 via belt 127.

On the other hand, second drive shaft 133 protrudes from screw 131 located on the other side of supercharger 111. Even when second drive shaft 133 is driven to rotate, supercharger 111 operates to compress intake air similarly to first drive shaft 121. Supercharger driving motor 135 (motor generator) is connected to second drive shaft 133. Supercharger driving motor 135 is connected to battery 141 for running via DC-DC converter 137 and inverter 139.

Inverter ECU 143 performs power running control and regeneration control of supercharger driving motor 135. When the power running control of supercharger driving motor 135 is performed, direct-current (DC) power from battery 141 is converted into alternating-current (AC) power by inverter 139 and then stepped down by DC-DC converter 137. The supplied power allows supercharger driving motor 135 to rotate drive shaft 133, so that supercharger 111 is operated. Further, when the regeneration control of supercharger driving motor 135 is performed, the rotation from second drive shaft 133 of supercharger 111 allows supercharger driving motor 135 to generate electric power. The generated electric power is boosted by DC-DC converter 137 and converted into DC power by inverter 139, and then charged in battery 141.

CITATION LIST

Patent Literature

PTL 1: Japanese Patent Laid-Open Publication No. 2013-181393

SUMMARY

A vehicle drive device includes an engine configured to be mounted to a vehicle, a drive shaft mechanically connected to the engine as to drive the vehicle, a first power connecting-disconnecting unit connected to one of the drive shaft and the engine, a motor generator mechanically connected to the one of the drive shaft and the engine via the first power connecting-disconnecting unit, a second power connecting-disconnecting unit connected to the motor generator, and a supercharger mechanically connected to the motor generator via the second power connecting-disconnecting unit.

The vehicle drive device can retrieve regenerative electric power efficiently.

DETAIL DESCRIPTION OF PREFERRED EMBODIMENTS

Exemplary Embodiment 1

Figure 1:
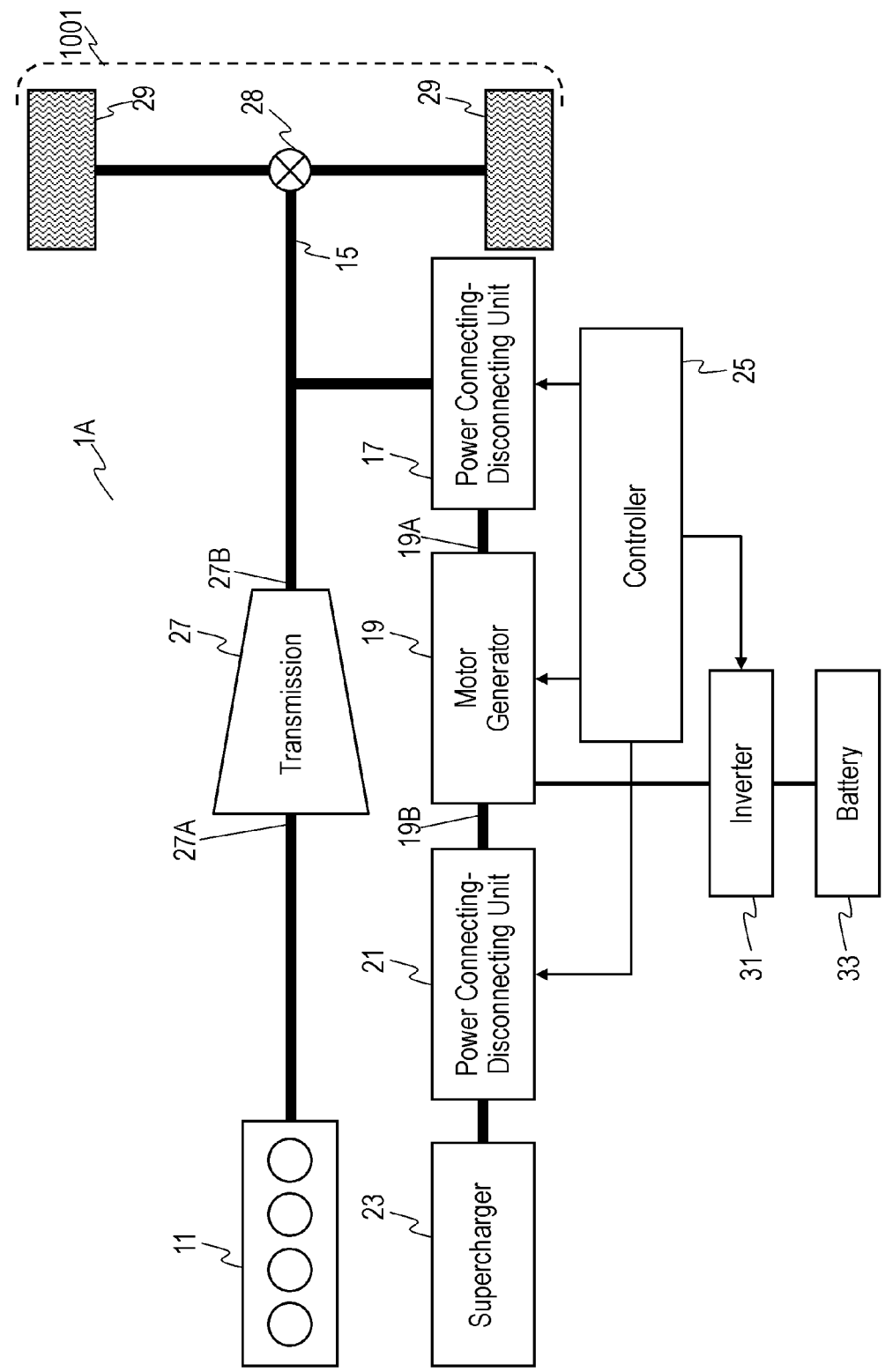
FIG. 1 is a schematic diagram of a vehicle drive device in accordance with Exemplary Embodiment 1.

FIG. 1 is a schematic diagram of vehicle drive device 1A in accordance with Exemplary Embodiment 1. Vehicle drive device 1A includes engine 11 mounted to vehicle 1001, drive shaft 15 mechanically connected to engine 11 to drive vehicle 1001, power connecting-disconnecting unit 17 connected to drive shaft 15, motor generator 19 mechanically connected to drive shaft 15 via power connecting-disconnecting unit 17, power connecting-disconnecting unit 21 connected to motor generator 19, supercharger 23 mechanically connected to motor generator 19 via power connecting-disconnecting unit 21, and controller 25. Controller 25 is electrically connected to power connecting-disconnecting unit 17, motor generator 19, and power connecting-disconnecting unit 21.

Motor generator 19 is connected directly to drive shaft 15 not via supercharger 23. This configuration allows deceleration kinetic energy to be retrieved without loss due to supercharger 23, thereby improving regeneration efficiency. Even if super charger 23 electrically driven by motor generator 19 is provided, vehicle drive device 1A that can retrieve regenerative electric power efficiently.

A configuration and operation of vehicle drive device 1A in accordance with Embodiment 1 will be described below.

In FIG. 1, input side 27A of transmission 27 is mechanically connected to engine 11. Transmission 27 performs 5-speed automatic transmission in accordance with Embodiment 1. In the configuration and operation of vehicle drive device 1A in accordance with Embodiment 1 described below, transmission 27 is not necessarily an automatic transmission, but may be an automatic continuously variable transmission or a manual transmission. Further, the number of shifts is not necessarily five speeds, but may be more or less than five speeds.

Output side 27B of transmission 27 is mechanically connected to tires 29 via drive shaft 15 and differential gear 28 for driving the vehicle. Power connecting-disconnecting unit 17 is mechanically connected to drive shaft 15. Power connecting-disconnecting unit 17 including a gear engaged with drive shaft 15 extracts driving force from drive shaft 15 or applies driving force to drive shaft 15. In accordance with Embodiment 1, power connecting-disconnecting unit 17 is implemented by a clutch. The clutch is controlled to be engaged and disengaged by an external signal. Further, a belt or a chain may be employed instead of the gear.

Motor generator 19 is mechanically connected to power connecting-disconnecting unit 17. Motor generator 19 has a double-shaft structure, i.e., has two shafts 19A and 19B. One shaft 19A of motor generator 19 is connected to power connecting-disconnecting unit 17. Motor generator 19 is driven by drive shaft 15 via power connecting-disconnecting unit 17 for generating electric power (regeneration), or for driving drive shaft 15 to rotate drive shaft 15 via power connecting-disconnecting unit 17 (power running). The regeneration and the power running are switched by an external signal.

Power connecting-disconnecting unit 21 is mechanically connected to the other shaft 19B of motor generator 19. Power connecting-disconnecting unit 21 has the same structure as power connecting-disconnecting unit 17.

Supercharger 23 is mechanically connected to power connecting-disconnecting unit 21. Supercharger 23 is mechanically connected to shaft 19B of motor generator 19 via power connecting-disconnecting unit 21. Therefore, supercharger 23 can be driven by motor generator 19 when power connecting-disconnecting unit 21 is engaged, thereby functioning as an electric supercharger. Supercharger 23 is connected to an air-intake pipe of engine 11.

Power connecting-disconnecting unit 17, motor generator 19, and power connecting-disconnecting unit 21 all are electrically connected to controller 25. Controller 25 controls switching between power running and regeneration of motor generator 19 while controlling engagement and disengagement of power connecting-disconnecting unit 17 and power connecting-disconnecting unit 21.

Controller 25 is implemented by a microcomputer and a peripheral circuit including a memory. In addition to the above operations, controller 25 also controls inverter 31 electrically connected to motor generator 19. Controller 25 also performs data communication with a vehicle-side controller.

When motor generator 19 generates regenerative electric power, inverter 31 converts the generated alternating-current (AC) power into direct-current (DC) power, and charges battery 33 electrically connected to inverter 31. On the other hand, when motor generator 19 performs power running, inverter 31 converts the DC power of battery 33 into AC power and supplies the AC power to motor generator 19.

Figure 2:
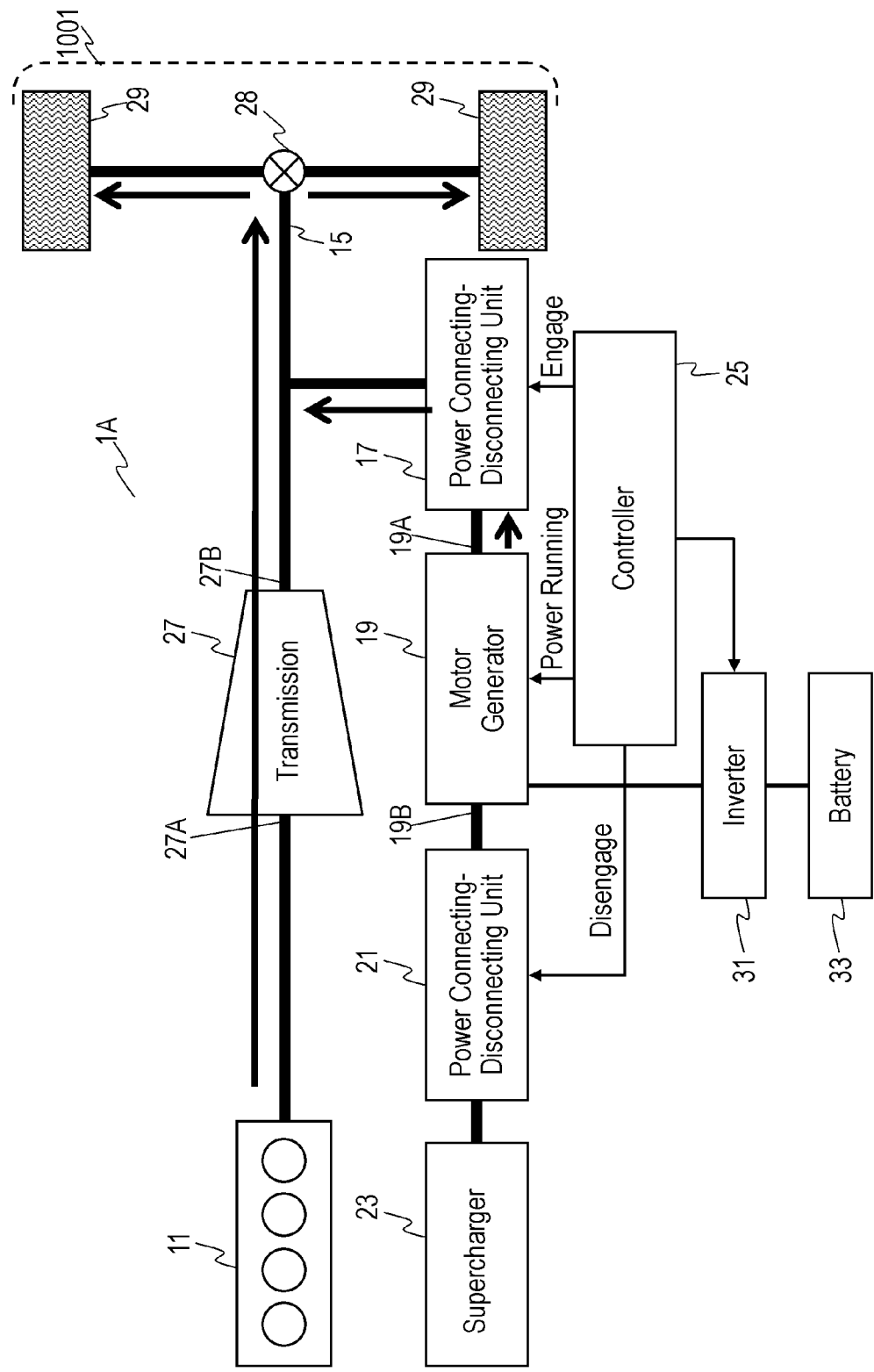
FIG. 2 is a schematic diagram of the vehicle drive device in accordance with Embodiment 1 for illustrating an operation of the vehicle drive device for assisting driving.
Figure 3:
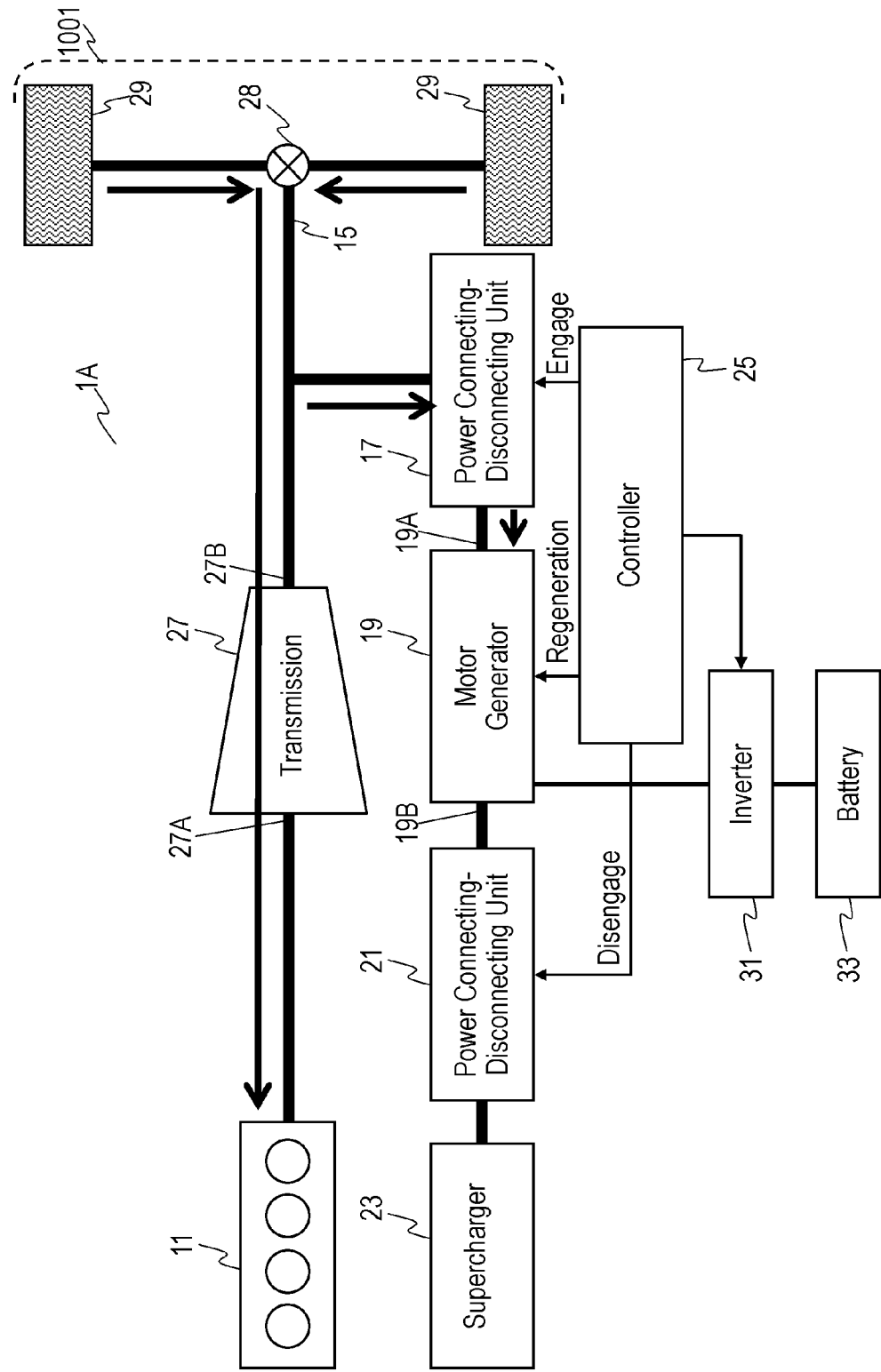
FIG. 3 is a schematic diagram of the vehicle drive device in accordance with Embodiment 1 for illustrating an operation of the vehicle drive device for performing regeneration.
Figure 4:
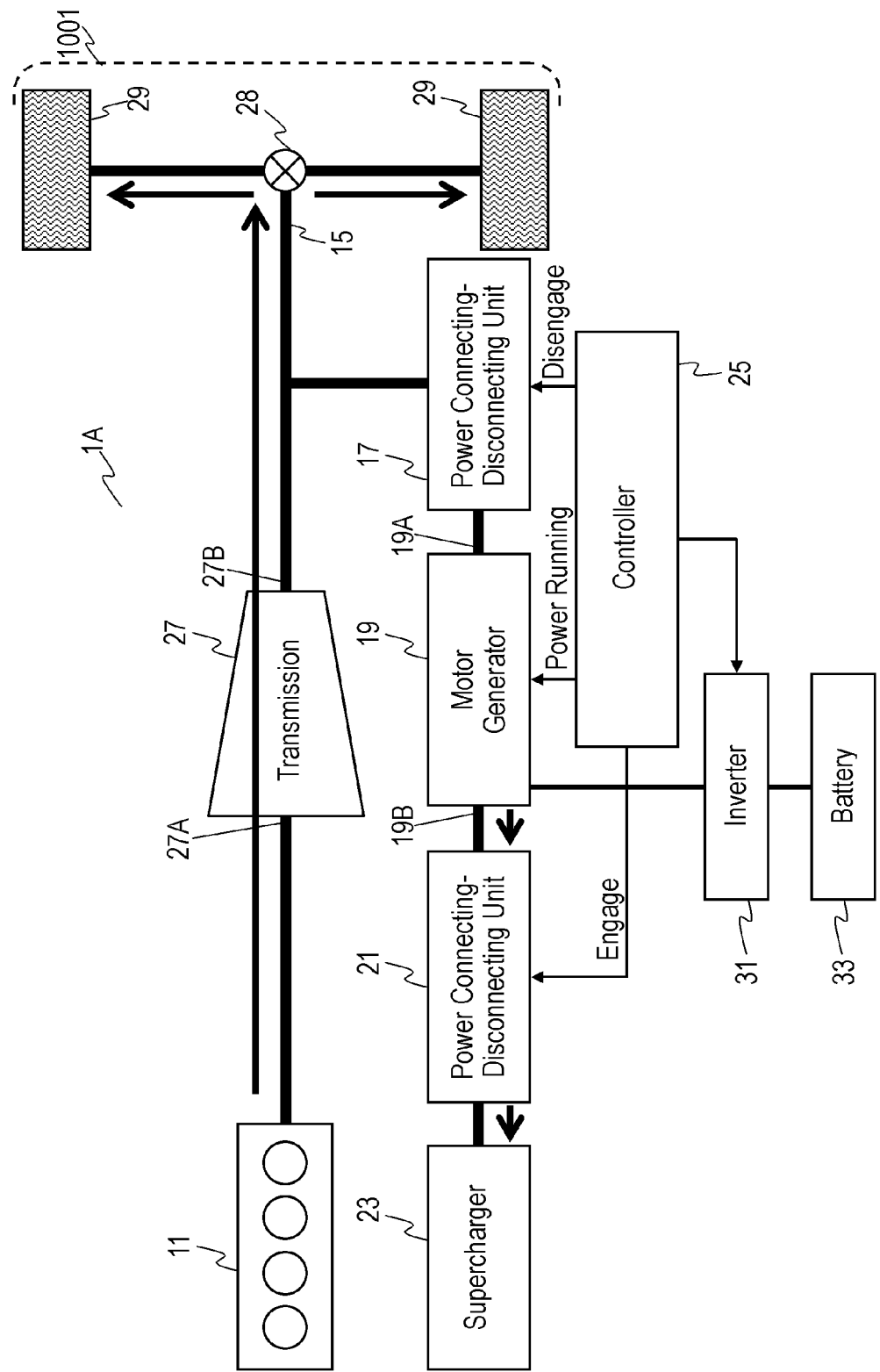
FIG. 4 is a schematic diagram of the vehicle drive device in accordance with Embodiment 1 for illustrating an operation of the vehicle drive device for driving a supercharger.

An operation of vehicle drive device 1A will be described below. FIGS. 2 to 4 are schematic diagrams of vehicle drive device 1A for illustrating an operation of vehicle drive device 1A. Thick arrows shown in FIGS. 2 to 4 represent directions in which driving force transmits.

First, an operation of motor generator 19 performing driving assistance while a vehicle is running will be described with referring to FIG. 2. Engine 11 drives tires 29 via transmission 27 and differential gear 28. For instance, when a driver suddenly depresses an accelerator pedal, controller 25 engages power connecting-disconnecting unit 17 and disengages power connecting-disconnecting unit 21 to increase driving force. Thus, the driving force of motor generator 19 is transmitted only to power connecting-disconnecting unit 17, but not transmitted forward from power connecting-disconnecting unit 21. Then, controller 25 controls inverter 31 such that the DC power stored in battery 33 is converted into AC power and the AC power is supplied to motor generator 19 while controlling motor generator 19 such that power running is performed. This operation allows motor generator 19 to be driven by the output of battery 33, and the driving force of motor generator 19 is transmitted to drive shaft 15 via power connecting-disconnecting unit 17. As a result, both the driving forces of motor generator 19 and engine 11 are applied to tires 29, thereby accelerating vehicle 1001 in response to the sudden depression of the accelerator pedal.

Next, an operation when vehicle 1001 is decelerated will be described with referring to FIG. 3. When the driver depresses a brake pedal of vehicle 1001 to decelerate vehicle 1001, deceleration energy is partially transmitted from drive shaft 15 to engine 11 via transmission 27. This causes a state that an engine brake is applied at the deceleration. At this moment, controller 25 engages power connecting-disconnecting unit 17 while disengaging power connecting-disconnecting unit 21, hence allowing motor generator 19 to generate regenerative electric power. At this moment, controller 25 controls inverter 31 to charge battery 33. This operation allows the electric regenerative power to be retrieved into battery 33 efficiently without passing through supercharger 23.

Next, the case where supercharger 23 is driven will be described with referring to FIG. 4. When the driver depresses the accelerator pedal due to, e.g. rapid acceleration, controller 25 determines whether engine 11 is to be supercharged or not. When determining that engine 11 is to be supercharged, controller 25 controls motor generator 19 to perform power running while disengaging power connecting-disconnecting unit 17 and engaging power connecting-disconnecting unit 21. At this moment, controller 25 controls inverter 31 to supply electric power of the battery 33 to motor generator 19. As a result, supercharger 23 is driven electrically by motor generator 19. Then, engine 11 drives drive shaft 15 while intake air is supercharged by supercharger 23 and supplied to engine 11. Therefore, high driving force is transmitted from drive shaft 15 to tires 29 via differential gear 28. This operation can run engine 11 at high power.

The above operations will be summarized as follows. When assisting driving of the vehicle is performed, controller 25 engages power connecting-disconnecting unit 17 and disengages power connecting-disconnecting unit 21. Thus, controller 25 supplies electric power to motor generator 19 and allows motor generator 19 to perform power running. Further, when the vehicle is decelerated, controller 25 engages power connecting-disconnecting unit 17 and disengages power connecting-disconnecting unit 21. Thus, controller 25 allows motor generator 19 to perform regeneration such that motor generator 19 generates electric power. Further, when engine 11 is supercharged, controller 25 disengages power connecting-disconnecting unit 17 and engages power connecting-disconnecting unit 21 to allow motor generator 19 to perform power running.

The above operations provide vehicle drive device 1A capable of supercharging, performing driving force assistance, and further performing regeneration by using single motor generator 19. In order to determine whether engine 11 is supercharged by motor generator 19 to output high power or driving force of engine 11 is assisted by drive shaft 15, controller 25 totally checks statuses, such as a speed and an inclination angle of depressing the accelerator pedal, a capacity remaining in battery 33, and position information obtained by a car navigation system.

Figure 18:
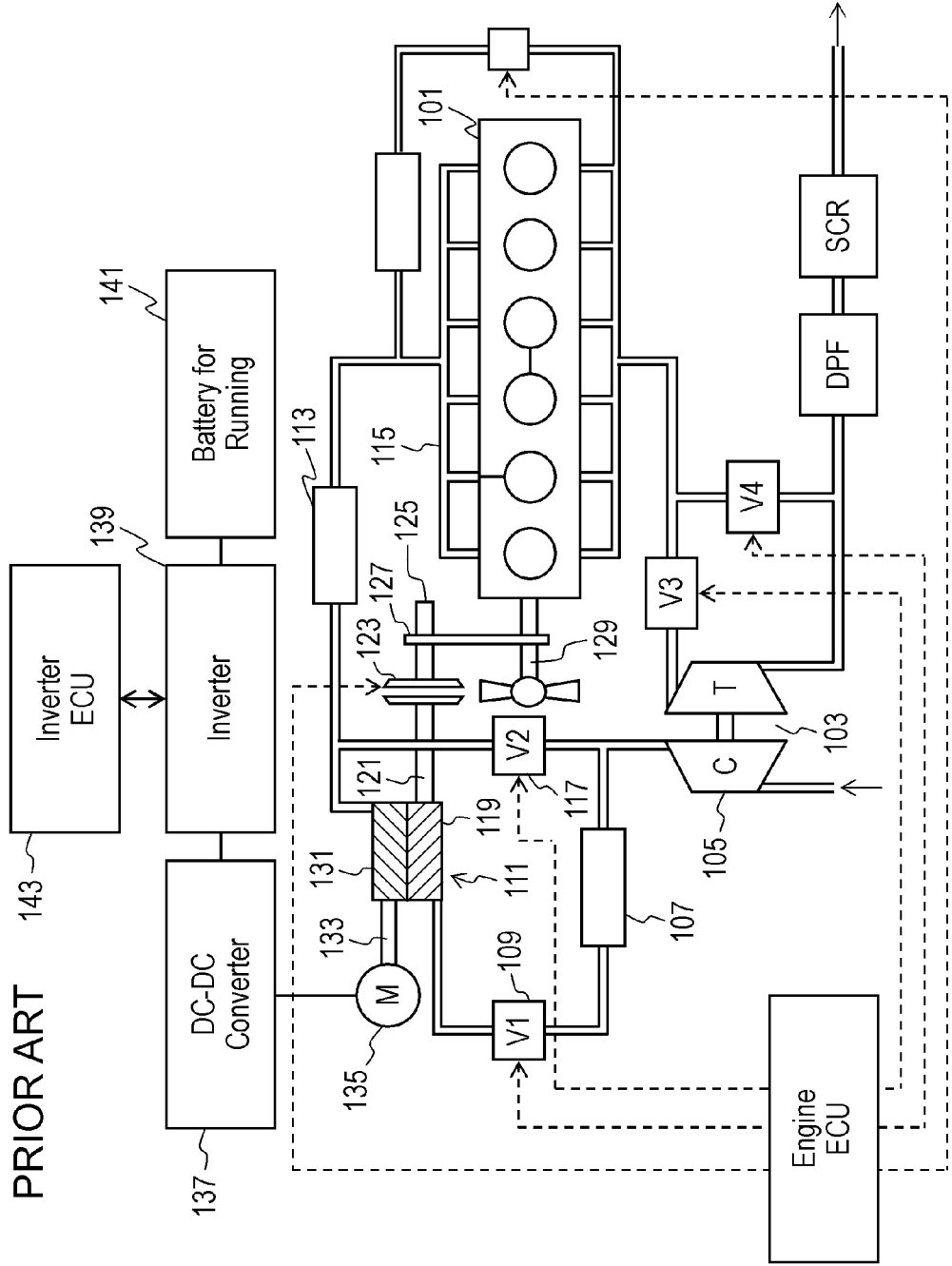
FIG. 18 is a detailed view of the conventional supercharger system.

PTL 1 describes that the conventional supercharging system shown in FIG. 18 can effectively utilize devices, which constitute the system, in not only constant speed running or accelerated running of a vehicle but also in decelerated running. In the conventional supercharging system shown in FIG. 18, especially when regeneration is performed during deceleration, supercharger driving motor 135 retrieves deceleration kinetic energy of the vehicle via supercharger 111, thereby operating supercharger 111 unnecessarily. Thus, an extra loss due to the above operation occurs when regenerative electric power is retrieved. Consequently, the regenerative efficiency is reduced.

In the above configuration and operation of vehicle drive device 1A according to Embodiment 1, motor generator 19 is connected directly to the drive shaft 15 not via supercharger 23. As a result, deceleration kinetic energy can be retrieved without a loss caused by supercharger 23, thereby improving regeneration efficiency. Accordingly, even if electric supercharger 23 is provided, vehicle drive device 1A can retrieve regenerative electric power efficiently.

Exemplary Embodiment 2

Figure 5:
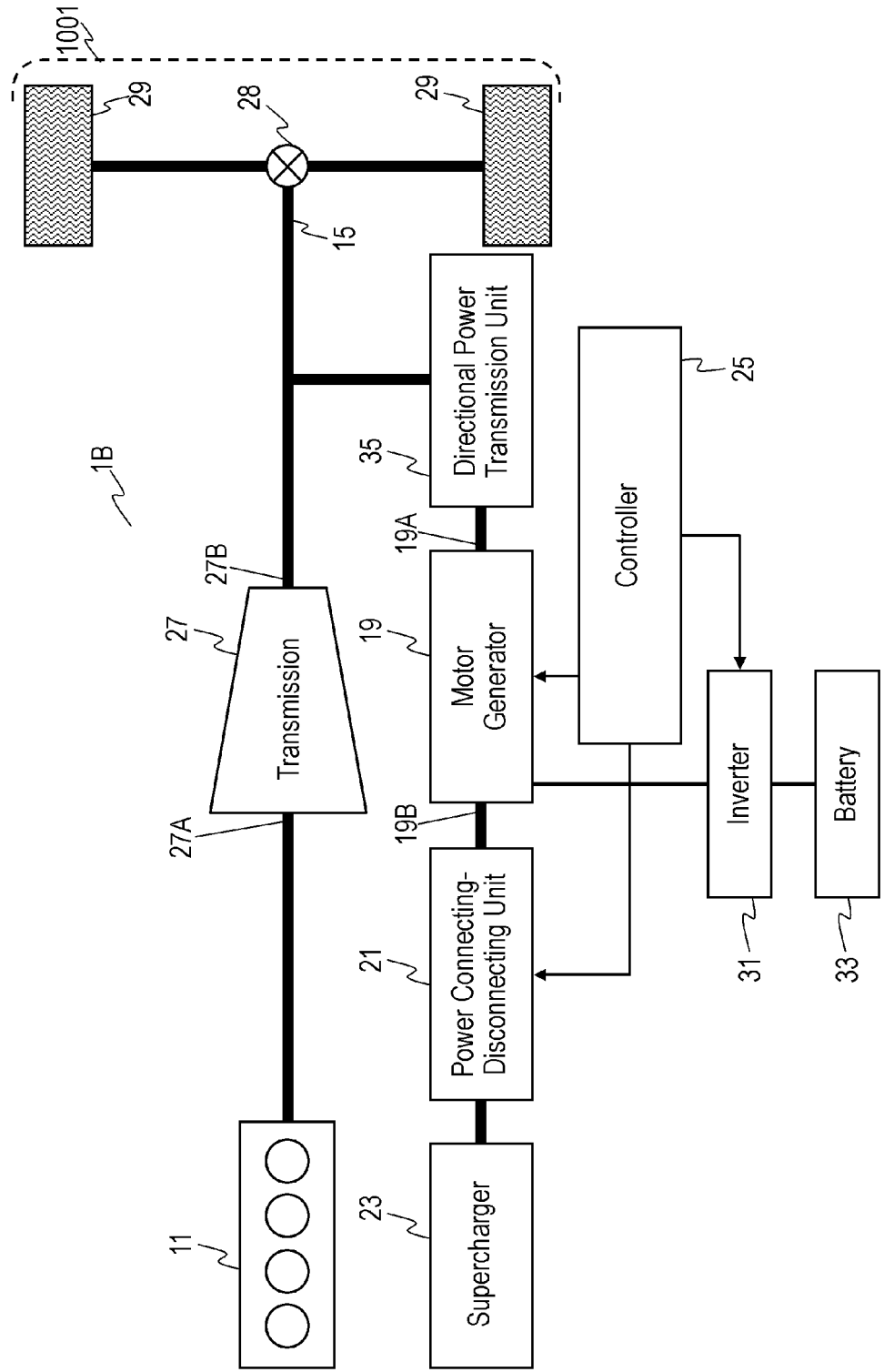
FIG. 5 is a schematic diagram of a vehicle drive device in accordance with Exemplary Embodiment 2.

FIG. 5 is a schematic diagram of vehicle drive device 1B in accordance with Exemplary Embodiment 2. In FIG. 5, components identical to those of the vehicle drive device 1A in accordance with Embodiment 1 shown in FIGS. 1 to 4 are denoted by the same reference numerals.

Vehicle drive apparatus 1B according to Embodiment 2 includes directional power transmission unit 35 instead of power connecting-disconnecting unit 17 of vehicle drive device 1A in accordance with Embodiment 1. Directional power transmission unit 35 transmits power only to motor generator 19 from drive shaft 15, but does not transmit power to drive shaft 15 from motor generator 19. When vehicle 1001 is decelerated, controller 25 disengages power connecting-disconnecting unit 21 and allows motor generator 19 to generate electric power to perform regeneration. When engine 11 is supercharged, controller 25 engages power connecting-disconnecting unit 21 and drives drive shaft 15 to allow motor generator 19 to perform power running. Accordingly, even if electric supercharger 23 is provided similarly to vehicle drive device 1A according to Embodiment 1, vehicle drive device 1B can retrieve regenerative electric power efficiently. Furthermore, it is not necessary to control directional power transmission unit 35, thereby providing vehicle drive device 1B with a simple structure.

Vehicle drive device 1B according to Embodiment 2 will be detailed below.

Directional power transmission unit 35 is mechanically connected between drive shaft 15 and motor generator 19. Directional power transmission unit 35 can transmit power only in one direction, and may be implemented by a one-way clutch and a two-way clutch. In accordance with Embodiment 2, directional power transmission unit 35 is implemented by a one-way clutch.

Directional power transmission unit 35 is configured to transmit power only to motor generator 19 from drive shaft 15. Accordingly, even if power is to be transmitted to drive shaft 15 from motor generator 19, directional power transmission unit 35 runs idle, i.e., prevents the power from being transmitted. This structure allows the clutch to be controlled in engaging and disengaging by an external signal unlike power connecting-disconnecting unit 17 in accordance with Embodiment 1, thereby simplifying the structure.

Figure 6:
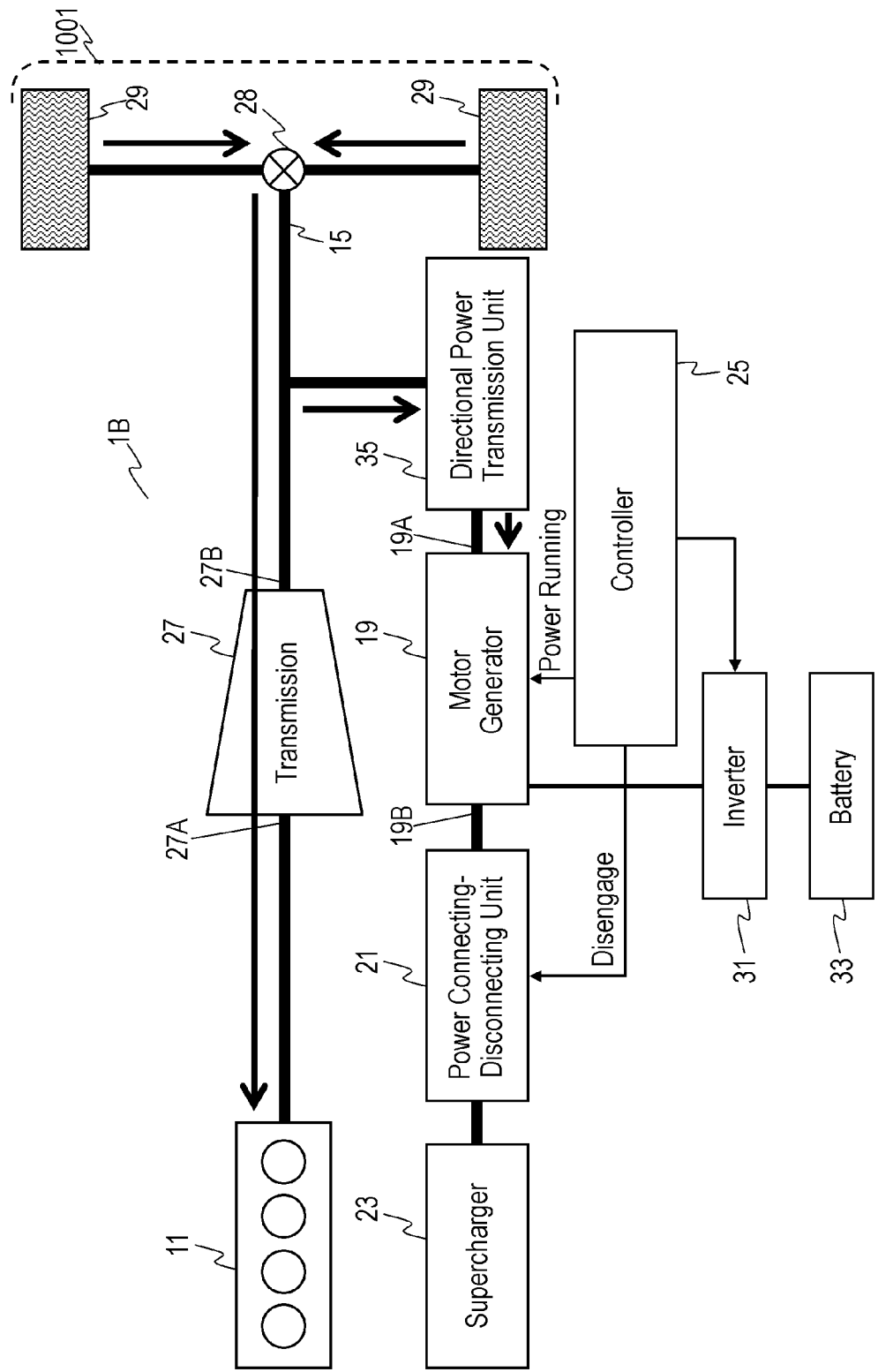
FIG. 6 is a schematic diagram of the vehicle drive device in accordance with Embodiment 2 for illustrating an operation of the vehicle drive device for performing regeneration.
Figure 7:
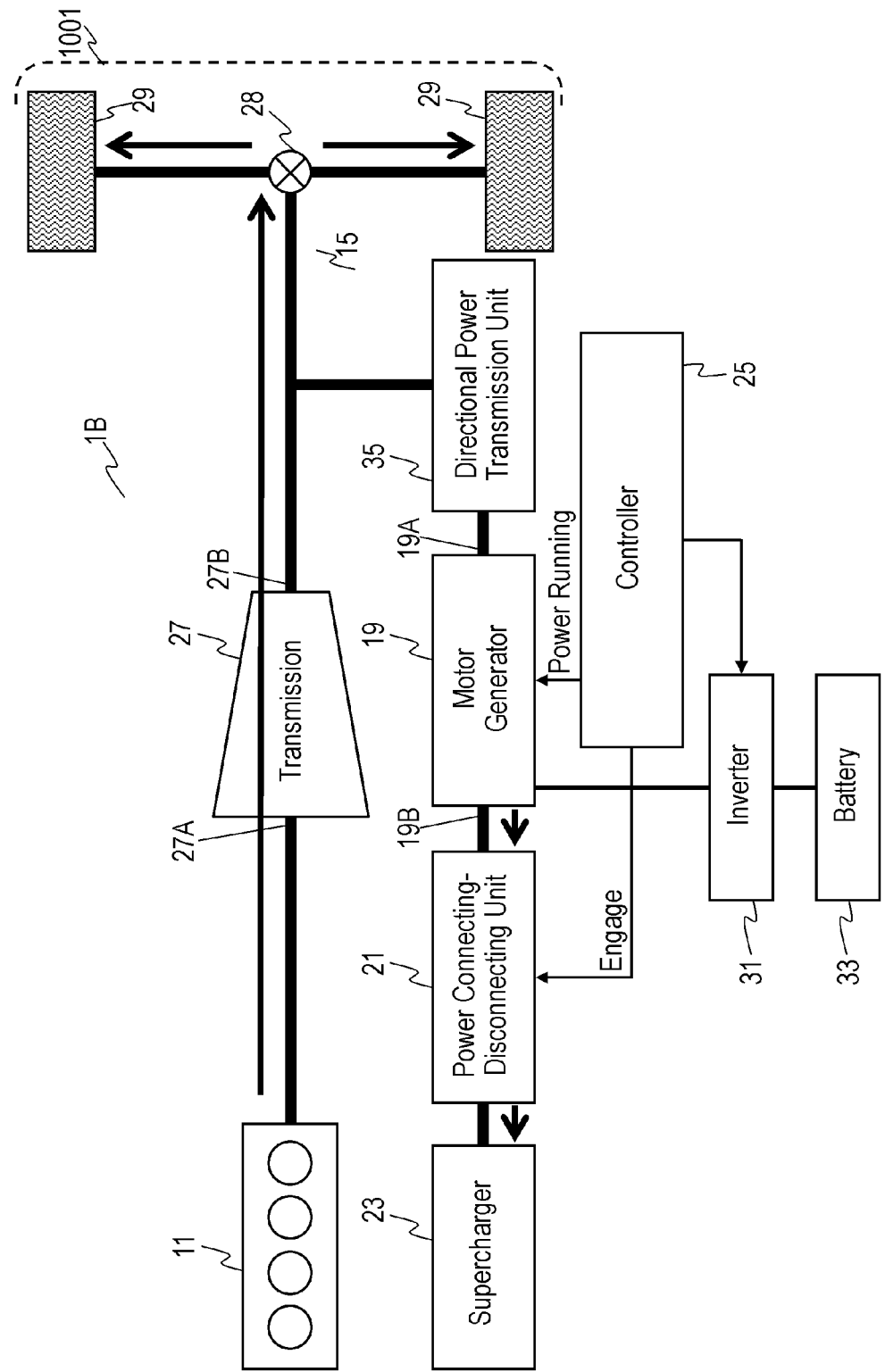
FIG. 7 is a schematic diagram of the vehicle drive device in accordance with Embodiment 2 for illustrating an operation of the vehicle drive device for driving supercharger.

Next, an operation of vehicle drive device 1B in accordance with Embodiment 2 will described. FIGS. 6 and 7 are schematic diagrams of vehicle drive device 1B for illustrating the operation of vehicle drive device 1B. Thick arrows shown in FIGS. 6 and 7 denote directions in which driving force is transmitted.

First, the case where vehicle 1001 is decelerated will be described with referring to FIG. 6. When a driver depresses a brake pedal of vehicle 1001 to decelerate vehicle 1001, deceleration energy is partially transmitted from drive shaft 15 to engine 11 via transmission 27. Thus, an engine brake is applied during deceleration. This operation is similar to Embodiment 1. In this case, controller 25 controls motor generator 19 to generate regenerative electric power while disengaging power connecting-disconnecting unit 21. At this moment, controller 25 controls inverter 31 to charge battery 33. Thus, since directional power transmission unit 35 transmits driving force only to motor generator 19 from drive shaft 15, the driving force of drive shaft 15 is directly transmitted to motor generator 19. As a result, the regenerative electric power can be retrieved efficiently without passing through supercharger 23. Controller 25 is not necessary to control power connecting-disconnecting unit 17 unlike vehicle drive device 1A according to Embodiment 1, thereby retrieving regenerative electric power by a simple structure.

Next, the case where supercharger 23 is driven will be described with referring to FIG. 7. When the driver depresses an accelerator pedal to, e.g. accelerate rapidly, controller 25 determines whether or not engine 11 is to be supercharged. This operation is similar to Embodiment 1. When determining that engine 11 is to be supercharged, controller 25 controls motor generator 19 to perform power running while engaging power connecting-disconnecting unit 21. At this moment, controller 25 controls inverter 31 to supply electric power of battery 33 to motor generator 19. As a result, supercharger 23 is electrically driven by motor generator 19. Then, engine 11 drives drive shaft 15 while intake air is compressed by supercharger 23 and supplied to engine 11. Therefore, high driving force is transmitted from drive shaft 15 to tires 29 via differential gear 28. This operation allows engine 11 to run at high output power. In this operation, since directional power transmission unit 35 transmits driving force only to the motor generator 19 from drive shaft 15, the driving force of motor generator 19 is not transmitted to a side to drive shaft 15. Therefore, controller 25 is not necessary to control power connecting-disconnecting unit 17 unlike Embodiment 1, thereby driving supercharger 23 by a simple structure.

Directional power transmission unit 35 disables vehicle drive device 1B according to Embodiment 2 to perform driving assistance unlike vehicle drive device 1A according to Embodiment 1. Accordingly, in the case where vehicle 1001 is particularly not necessary to perform driving assistance by motor generator 19, vehicle drive device 1B according to Embodiment 2 mounted in vehicle 1001 can be controlled simply. On the other hand, in the case where vehicle 1001 is necessary to perform driving assistance, vehicle drive device 1A according to Embodiment 1 is mounted to vehicle 1001.

In the above configuration and operation, even if electric supercharger 23 is provided, regenerative electric power can be retrieved efficiently. Additionally, it is not necessary to control directional power transmission unit 35, thereby providing vehicle drive device 1B with a simple structure.

Exemplary Embodiment 3

Figure 8:
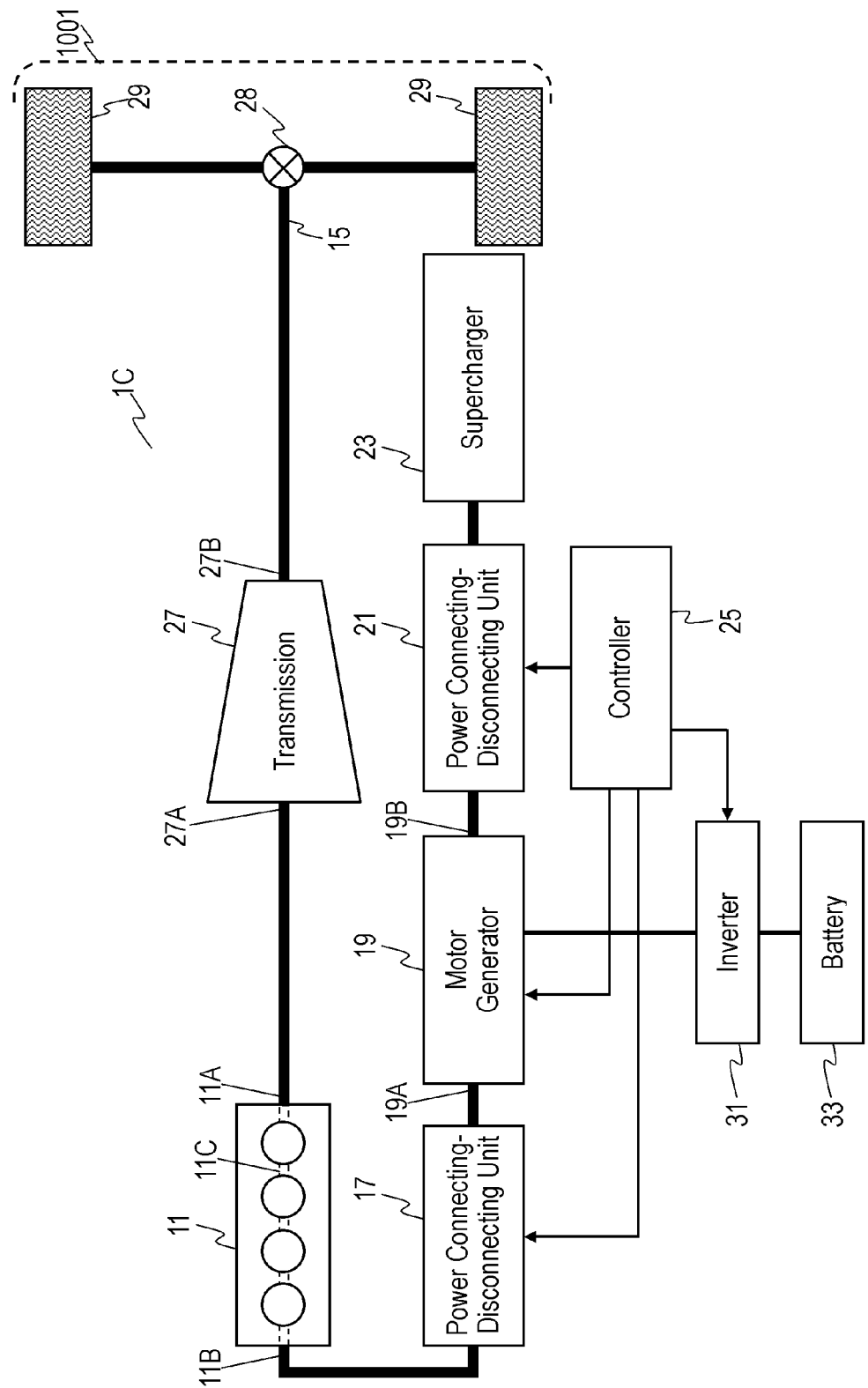
FIG. 8 is a schematic diagram of a vehicle drive device in accordance with Exemplary Embodiment 3.

FIG. 8 is a schematic diagram of vehicle drive device 1C in accordance with Exemplary Embodiment 3. In FIG. 8, components identical to those of vehicle drive device 1A according to Embodiment 1 shown in FIGS. 1 to 4 are denoted by the same reference numerals.

As shown in FIG. 8, vehicle drive device 1C includes engine 11 mounted to vehicle 1001, power connecting-disconnecting unit 17 connected to engine 11, motor generator 19 mechanically connected to engine 11 via power connecting-disconnecting unit 17, power connecting-disconnecting unit 21 connected to motor generator 19, supercharger 23 mechanically connected to motor generator 19 via power connecting-disconnecting unit 21, and controller 25. Controller 25 is electrically connected to power connecting-disconnecting unit 17, motor generator 19, and power connecting-disconnecting unit 21.

Thus, motor generator 19 is directly connected to engine 11 not via supercharger 23. As a result, deceleration kinetic energy can be retrieved without a loss caused by supercharger 23, thereby improving the regeneration efficiency. Accordingly, even if electric supercharger 23 is provided, vehicle drive device 1C can retrieve regenerative electric power efficiently.

A configuration and operation of vehicle drive device 1C according to Embodiment 3 will be described.

In FIG. 8, crank shaft 11C of engine 11 has end 11A connected to input side 27A of transmission 27, and has end 11B not connected to transmission 27. Power connecting-disconnecting unit 17 is mechanically connected to end 11B of engine 11. Engine 11 and power connecting-disconnecting unit 17 may not only be engaged with a gear but also be connected via a belt or chain.

Similarly to Embodiment 1, power connecting-disconnecting unit 17 is controlled to be engaged and disengaged by an external signal. Power connecting-disconnecting unit 17, motor generator 19, power connecting-disconnecting unit 21, and supercharger 23 are mechanically connected in this order. In other words, shaft 19A of motor generator 19 is connected to power connecting-disconnecting unit 17 while shaft 19B is connected to power connecting-disconnecting unit 21. Supercharger 23 is connected to shaft 19B of motor generator 19 via power connecting-disconnecting unit 21. Power connecting-disconnecting unit 17, motor generator 19, power connecting-disconnecting unit 21, and supercharger 23 have the same structure as in Embodiment 1.

Power connecting-disconnecting unit 17, motor generator 19, and power connecting-disconnecting unit 21 are electrically connected to controller 25. Battery 33 is electrically connected to motor generator 19 via inverter 31. Inverter 31 is electrically connected to controller 25. These details are also the same as in Embodiment 1.

Next, an operation of vehicle drive device 1C will be described. FIGS. 9 to 13 are schematic diagrams of vehicle drive device 1C for the operation thereof. Thick arrows shown in FIGS. 9 to 13 denote directions in which driving force is transmitted.

First, an operation when engine 11 of vehicle 1001 is started will be described with referring to FIG. 9. When engine 11 is started, controller 25 controls motor generator 19 to perform power running while engaging power connecting-disconnecting unit 17 and disengaging power connecting-disconnecting unit 21. Besides, this operation is an operation when engine 11 is restarted after idling stop while vehicle 1001 is running. Therefore, controller 25 controls inverter 31 to supply electric power of the battery 33 to motor generator 19. As a result, driving force of motor generator 19 is transmitted directly to engine 11 via power connecting-disconnecting unit 17. Thus, motor generator 19 starts up engine 11, thus functioning as a starter. At this moment, since power connecting-disconnecting unit 21 is disengaged, supercharger 23 does not operate. Thus, vehicle drive device 1C according to Embodiment 3 can start up engine 11.

Figure 10:
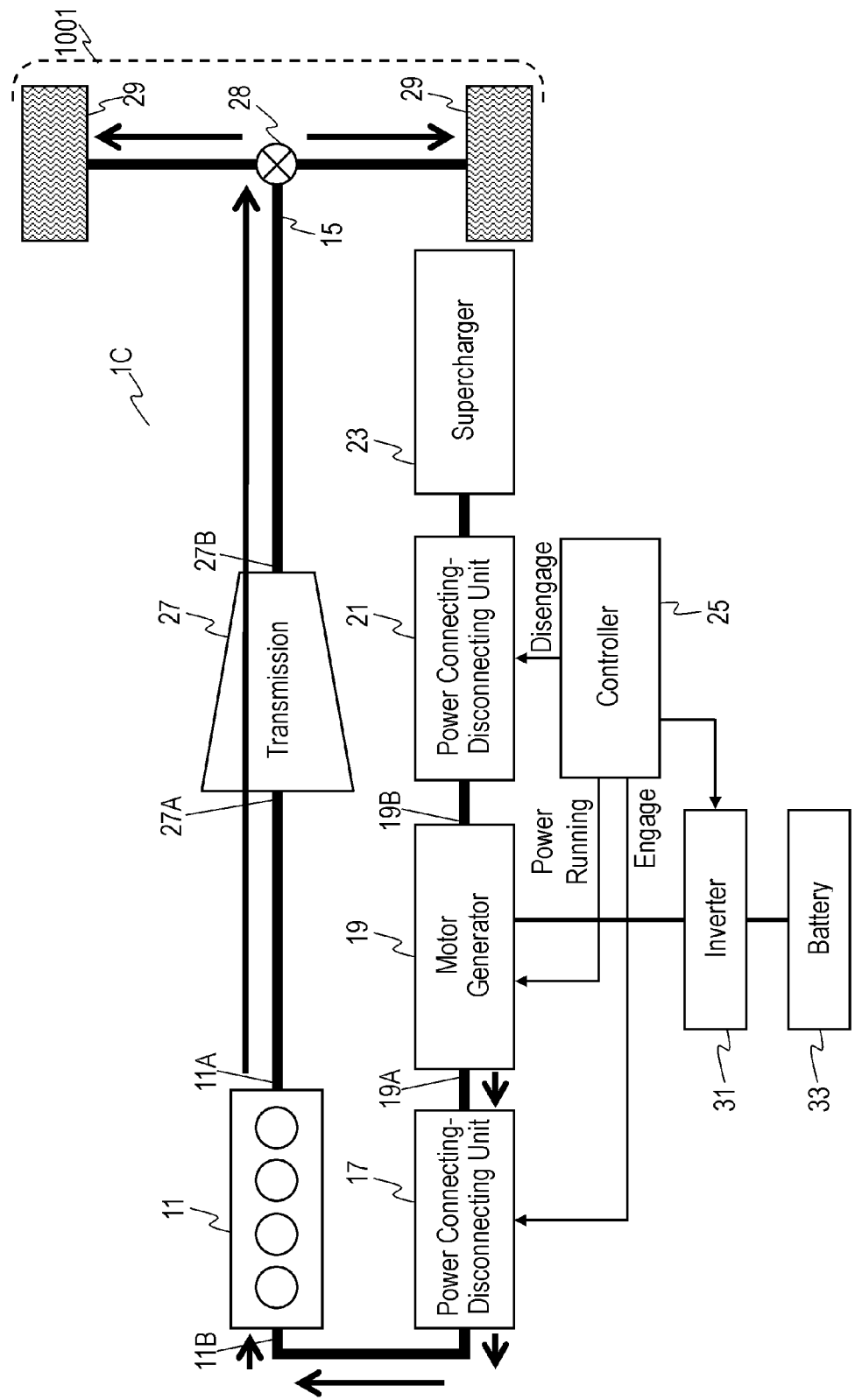
FIG. 10 is a schematic diagram of the vehicle drive device in accordance with Embodiment 3 for illustrating an operation of the vehicle drive device for assisting driving.

Next, driving assistance while vehicle 1001 is running will be described with referring to FIG. 10. When driving assistance is performed, controller 25 controls motor generator 19 to perform power running while engaging power connecting-disconnecting unit 17 and disengaging power connecting-disconnecting unit 21. This operation is similar to the above operation of engine 11. This operation allows driving force from motor generator 19 to be transmitted to engine 11. Engine 11 per se, drives tires 29, so that the driving force from motor generator 19 is added to an output of the engine 11 and drives tires 29. This operation assists driving force of engine 11 by motor generator 19.

Figure 11:
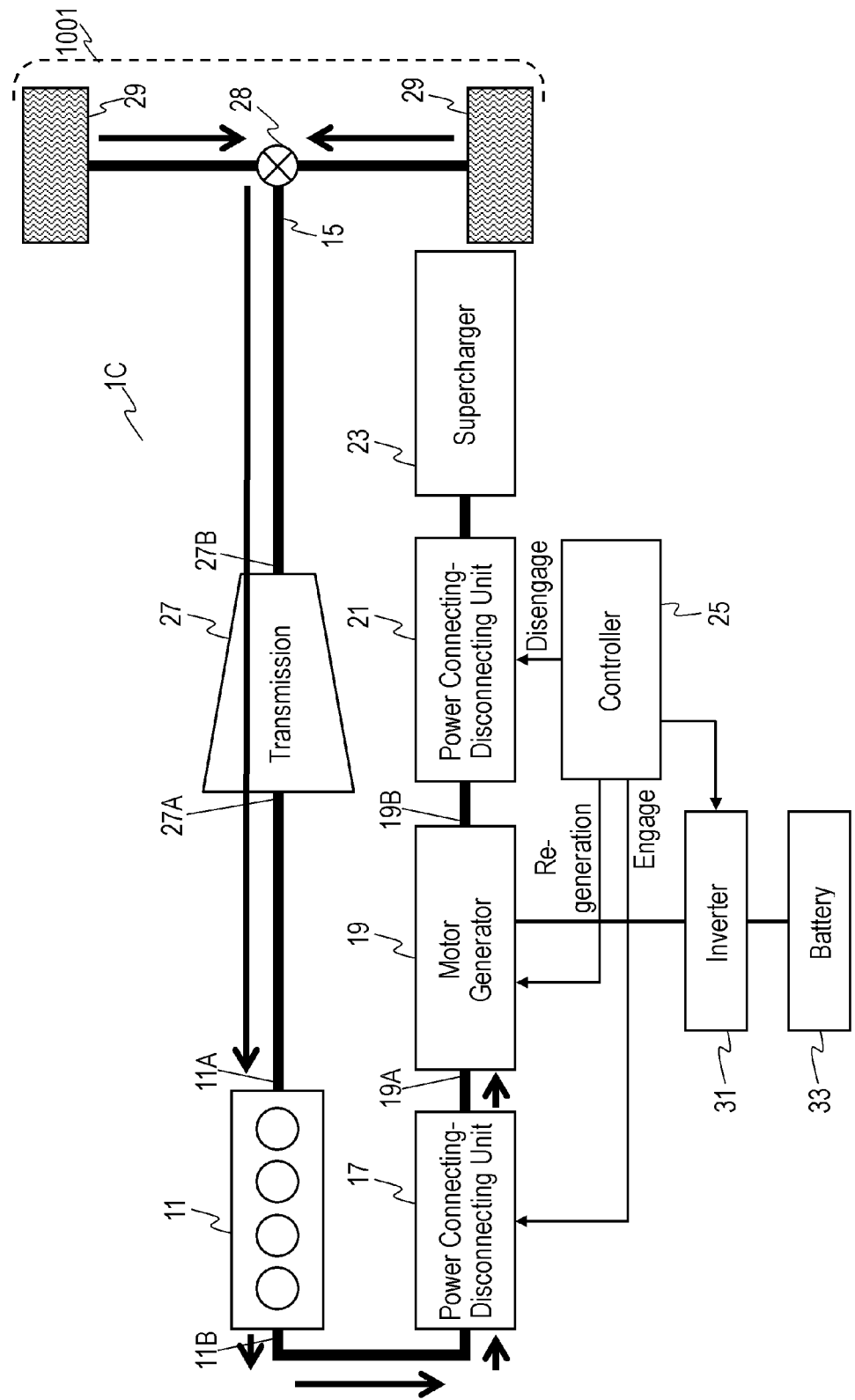
FIG. 11 is a schematic diagram of the vehicle drive device in accordance with Embodiment 3 for illustrating an operation of the vehicle drive device for performing regeneration.

Next, the case where vehicle 1001 is decelerated will be described with referring to FIG. 11. When a driver depresses a brake pedal to decelerate vehicle 1001, deceleration energy is partially transmitted from drive shaft 15 to engine 11 via transmission 27. Thus, an engine brake is applied during deceleration. At this moment, controller 25 controls motor generator 19 to generate regenerative electric power while engaging power connecting-disconnecting unit 17 and disengaging power connecting-disconnecting unit 21. At this moment, controller 25 controls inverter 31 to charge battery 33. Thus, the driving force due to deceleration of engine 11 is transmitted directly to motor generator 19 and can perform regeneration. As a result, regenerative electric power can be efficiently retrieved to battery 33 without passing thorough supercharger 23.

Figure 12:
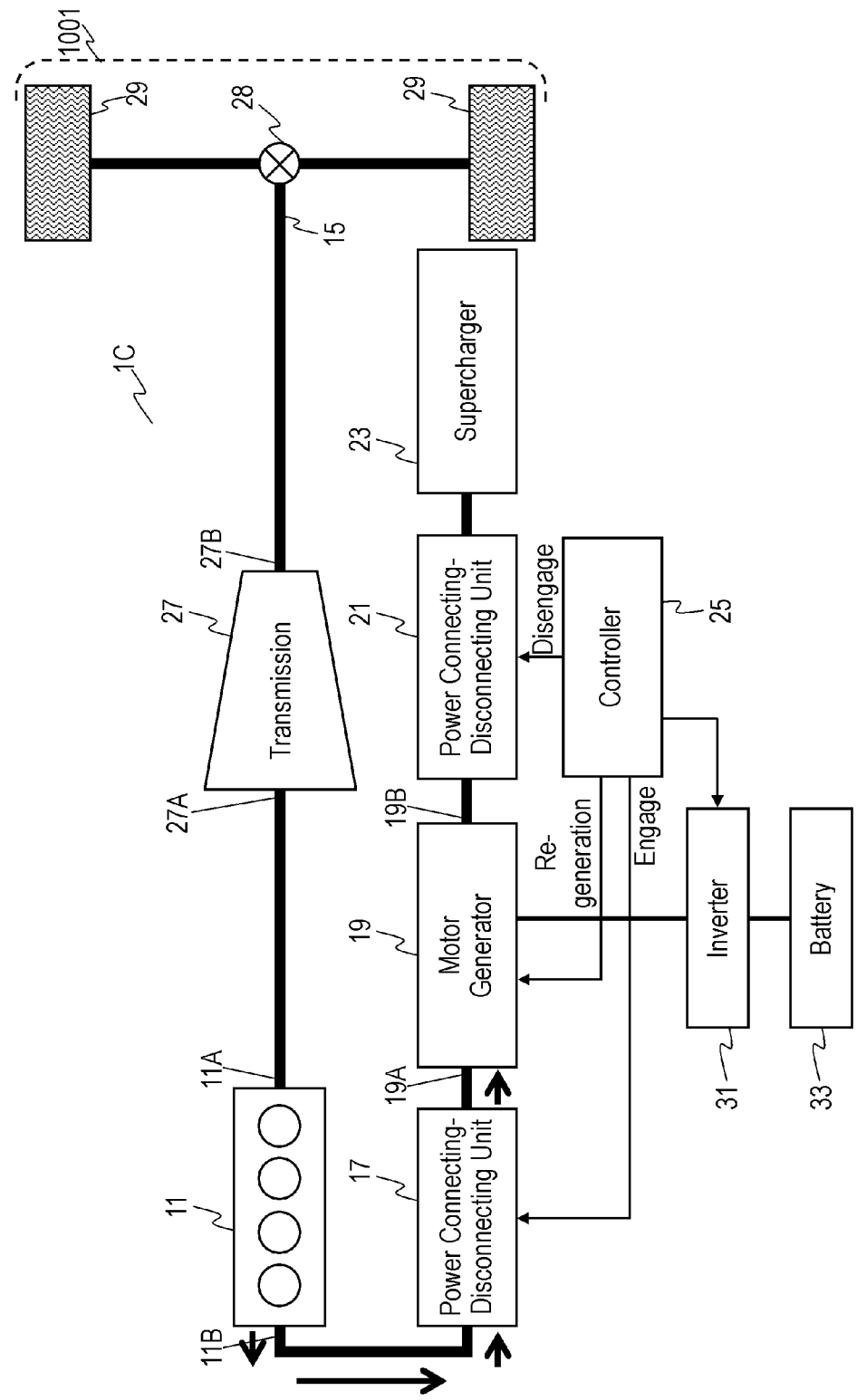
FIG. 12 is a schematic diagram of the vehicle drive device in accordance with Embodiment 3 for illustrating an operation of the vehicle drive device when an engine generates electric power while a vehicle is stopped.

Next, an operation when electric power is generated by engine 11 while vehicle 1001 is stopped will be described with referring to FIG. 12. This operation is performed when an idling stop period in an idling stop vehicle is too long to keep electric power remaining in the battery.

Figure 9:
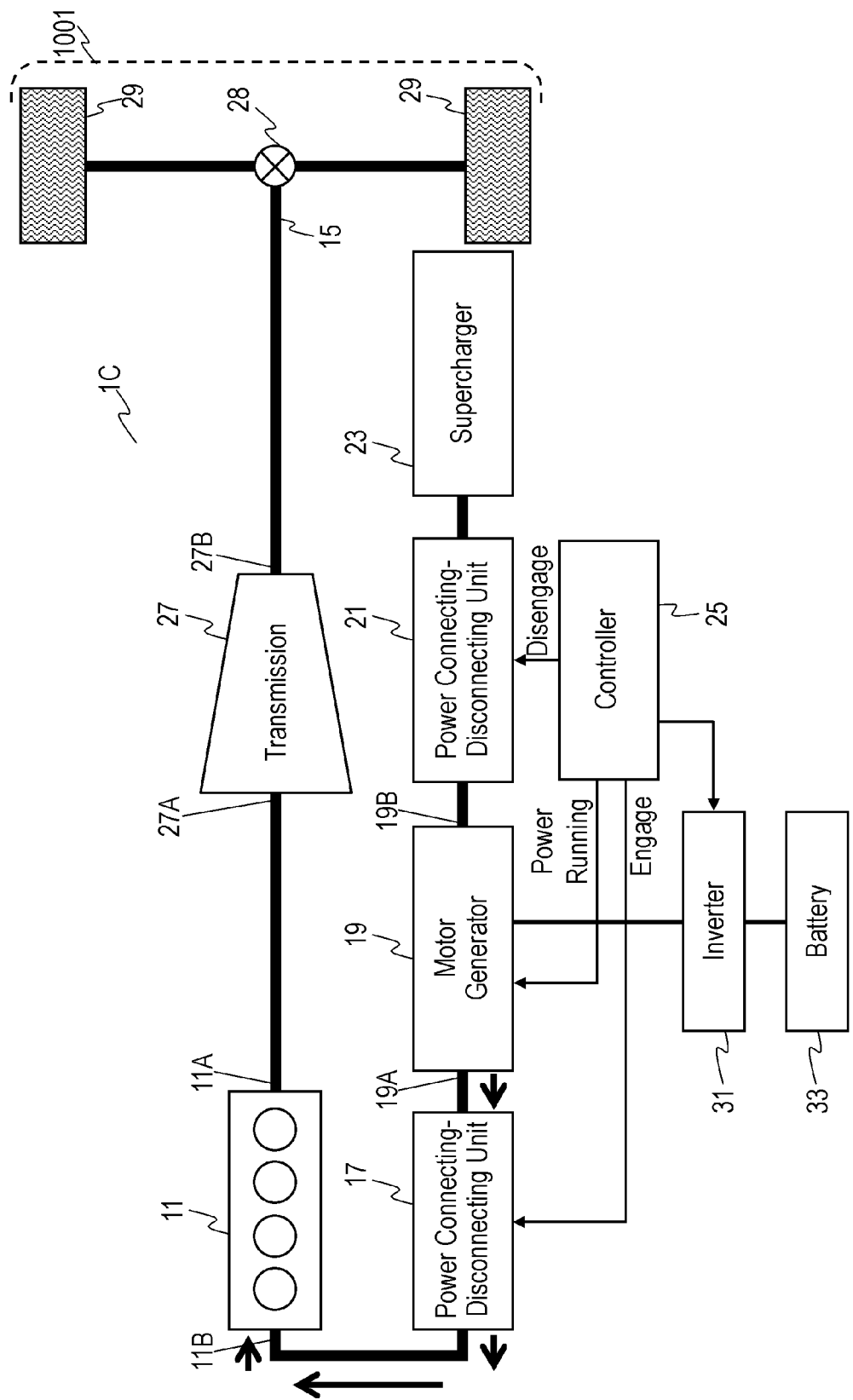
FIG. 9 is a schematic diagram of the vehicle drive device in accordance with Embodiment 3 for illustrating an operation of the vehicle drive device for starting an engine.

If the electric power remaining in battery 33 decreases to a predetermined lower limit value that is previously determined, controller 25 restarts engine 11 by the operation described in FIG. 9. The predetermined lower limit value is electricity remaining or stored in battery 33 only enough to restart engine 11.

When restarting engine 11 is completed after idling stop, controller 25 controls motor generator 19 to generate regenerative electric power while maintaining engaging and disengaging of power connecting-disconnecting unit 17 and power connecting-disconnecting unit 21, i.e., while maintaining engaging power connecting-disconnecting unit 17 and disengaging power connecting-disconnecting unit 21. As a result, driving force of engine 11 is transmitted to motor generator 19 via power connecting-disconnecting unit 17, and then electric power is generated by motor generator 19. Therefore, even though idling stop is performed, electric power can be supplied to electrical equipment mounted to vehicle 1001 while battery 33 is charged by the above operation. With this operation, even if the electric power remaining in battery 33 decreases during idling stop, vehicle drive device 1C can ensure electric power.

Figure 13:
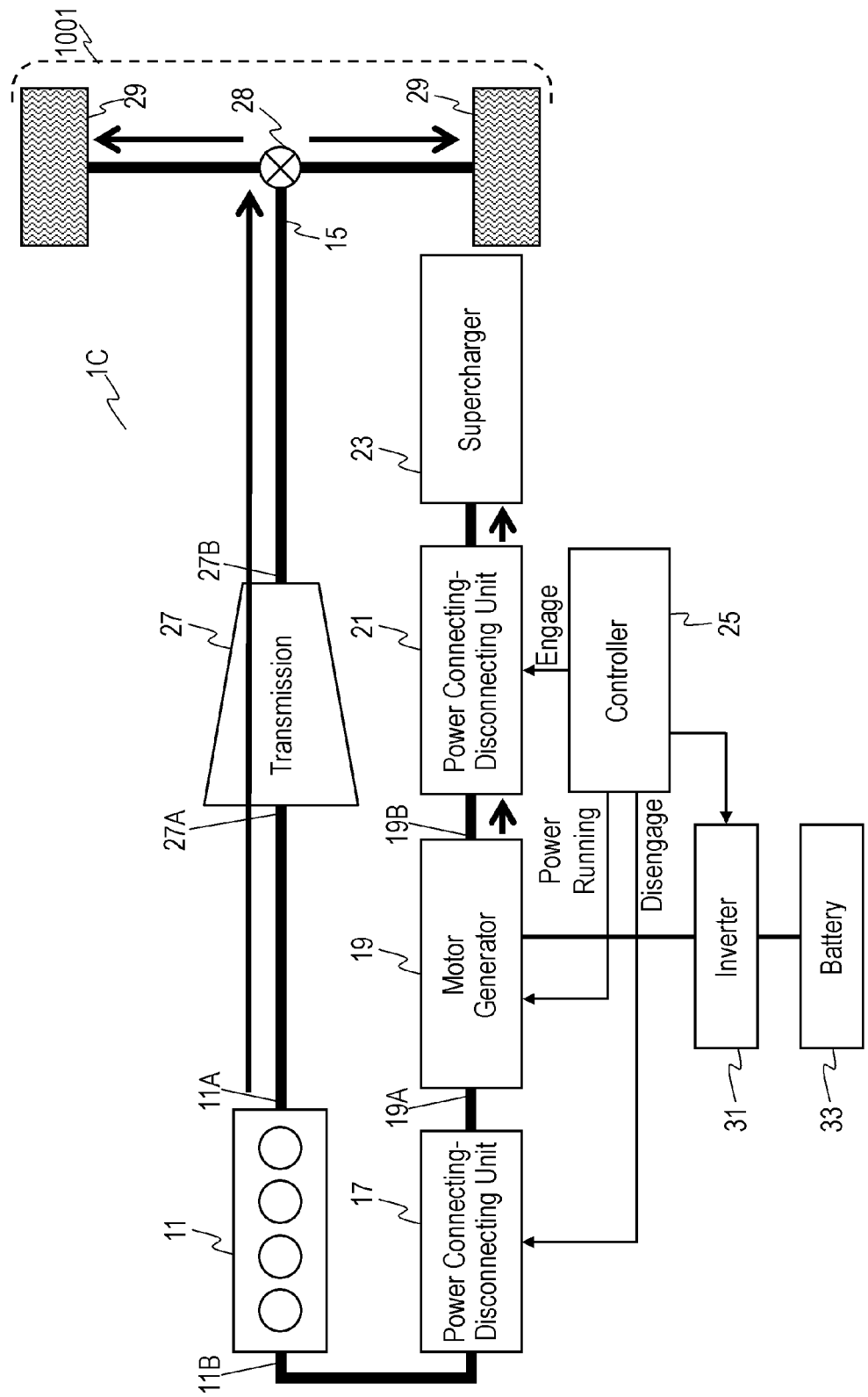
FIG. 13 is a schematic diagram of the vehicle drive device in accordance with Embodiment 2 for illustrating an operation of the vehicle drive device for driving a supercharger.

Next, the case where supercharger 23 is driven will be described with referring to FIG. 13. When determining that engine 11 is to be supercharged, controller 25 controls motor generator 19 to perform power running while disengaging power connecting-disconnecting unit 17 and engaging power connecting-disconnecting unit 21. At this moment, controller 25 controls inverter 31 to supply electric power of battery 33 to motor generator 19. As a result, supercharger 23 is driven by motor generator 19. This operation allows engine 11 to run at high output power. Therefore, this operation is similar to the driving operation of supercharger 23 in accordance with Embodiment 1.

The above operations are summarized as follows. When engine 11 is started or when driving assistance of vehicle 1001 is performed, controller 25 engages power connecting-disconnecting unit 17 and disengages power connecting-disconnecting unit 21, and then supplies electric power to motor generator 19 to allow motor generator 19 to perform power running. Further, when vehicle 1001 is decelerated or when electric power is generated by engine 11 while vehicle 1001 is stopped, controller 25 engages power connecting-disconnecting unit 17 and disengages power connecting-disconnecting unit 21, and then, allows motor generator 119 to perform regeneration to generate electric power. Furthermore, when engine 11 is supercharged, controller 25 disengages power connecting-disconnecting unit 17 and engages power connecting-disconnecting unit 21, and then allows motor generator 19 to perform power running.

The operations described above can provide vehicle drive device 1C in which, by using single motor generator 19, engine 11 can generate electric power when engine 11 is started or while a vehicle is stopped, in addition to perform the supercharging, the driving force assistance, and the regeneration in vehicle drive device 1A according to Embodiment 1. With the above configuration and operation, motor generator 19 is directly connected to engine 11 not via supercharger 23. As a result, deceleration kinetic energy can be retrieved without a loss caused by supercharger 23, thereby improving regeneration efficiency. Accordingly, even if electric supercharger 23 is provided, vehicle drive device 1C can retrieve regenerative electric power efficiently.

As described above, in vehicle drive device 1C according to Embodiment 1, the engine can generate electric power when the engine is started or while the vehicle is stopped, in addition to perform the supercharging, the driving force assistance, and the regenerative operation according to Embodiment 1. However, in vehicle drive device 1A according to Embodiment 1, motor generator 19 is directly connected to drive shaft 15 only via power connecting-disconnecting unit 17. Therefore, the deceleration kinetic energy generated in tires 29 can be retrieved more directly, and the driving assistance can also be performed more directly. Consequently, vehicle drive device 1C according to Embodiment 3 is preferable in the case that single motor generator 19 performs multi-function. If a higher efficiency is required, vehicle driving device 1A according to Embodiment 1 is preferable.

Exemplary Embodiment 4

Figure 14:
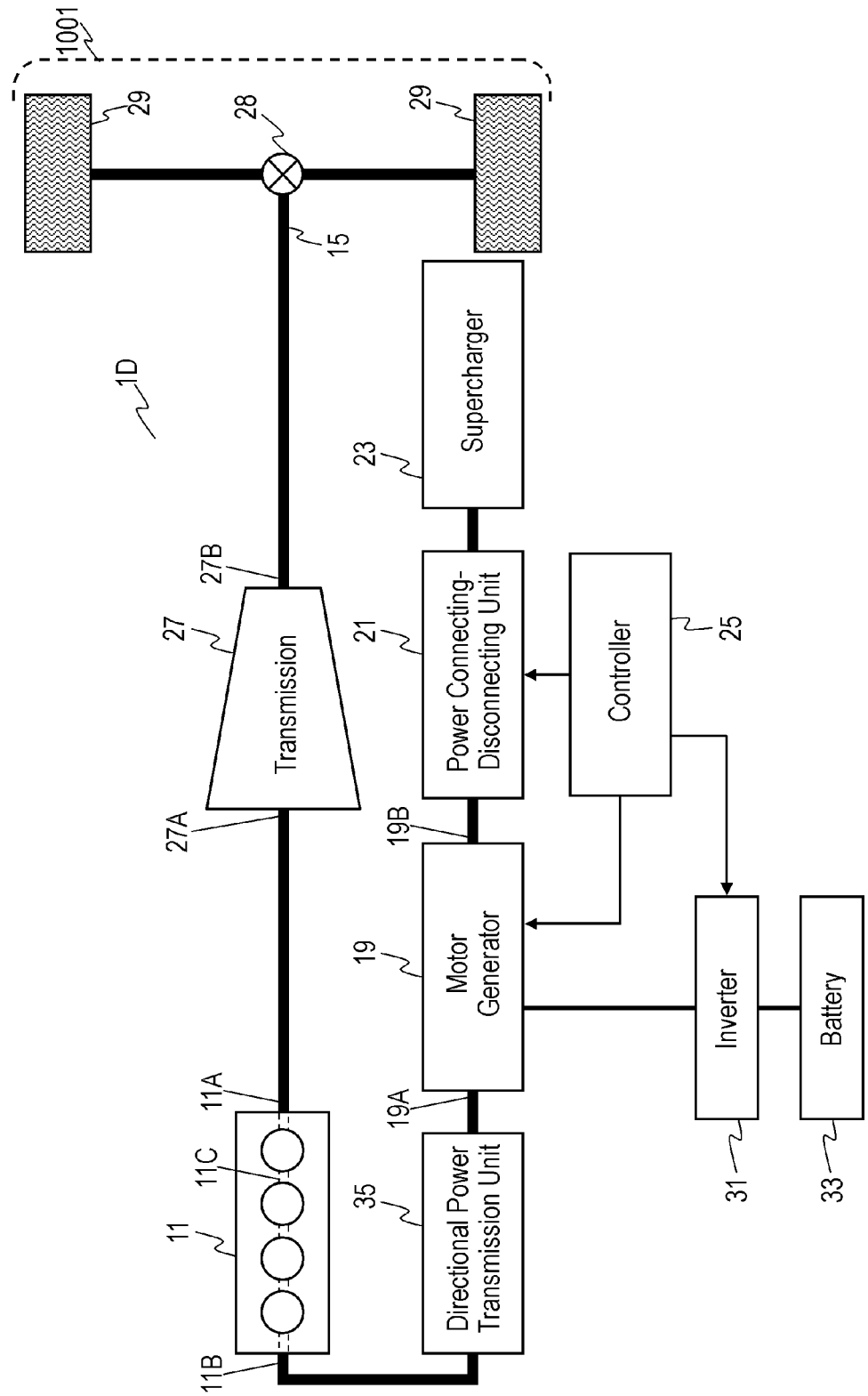
FIG. 14 is a schematic diagram of a vehicle drive device in accordance with Exemplary Embodiment 4.

FIG. 14 is a schematic diagram of vehicle drive device 1D in accordance with Exemplary Embodiment 4. In FIG. 14, components identical to those of vehicle drive devices 1A to 1C according to Embodiments 1 to 3 shown in FIGS. 1 to 13 are dented by the same reference numerals.

Vehicle drive apparatus 1D according to Embodiment 4 includes directional power transmission unit 35 instead of power connecting-disconnecting unit 17 shown in FIGS. 8 to 13. Directional power transmission unit 35 transmits power only to motor generator 19 from engine 11, and does not transmit power to engine 11 from motor generator 19. When vehicle 1001 is decelerated or when engine 11 generates electric power while vehicle 1001 is stopped, controller 25 disengages power connecting-disconnecting unit 21 and allows motor generator 19 to perform regeneration. Further, when engine 11 is supercharged, controller 25 engages power connecting-disconnecting unit 21 and allows motor generator 19 to perform power running. Thus, similarly to Embodiment 1, regenerative electric power can be retrieved efficiently even if supercharger 23 is provided. This eliminates the control of directional power transmission unit 35, thereby providing vehicle driving device 1D with a simple structure.

Vehicle drive device 1D according to Embodiment 4 will be detailed below.

As shown in FIG. 14, directional power transmission unit 35 is mechanically connected between engine 11 and motor generator 19. Directional power transmission unit 35 has the same structure as in Embodiment 2. According to Embodiment 4, directional power transmission unit 35 to transmit driving force of engine 11 only to motor generator 19 but does not transmit driving force of motor generator 19 to engine 11. Configurations other than the above are the same as in vehicle drive device 1C according to Embodiment 3.

Figure 15:
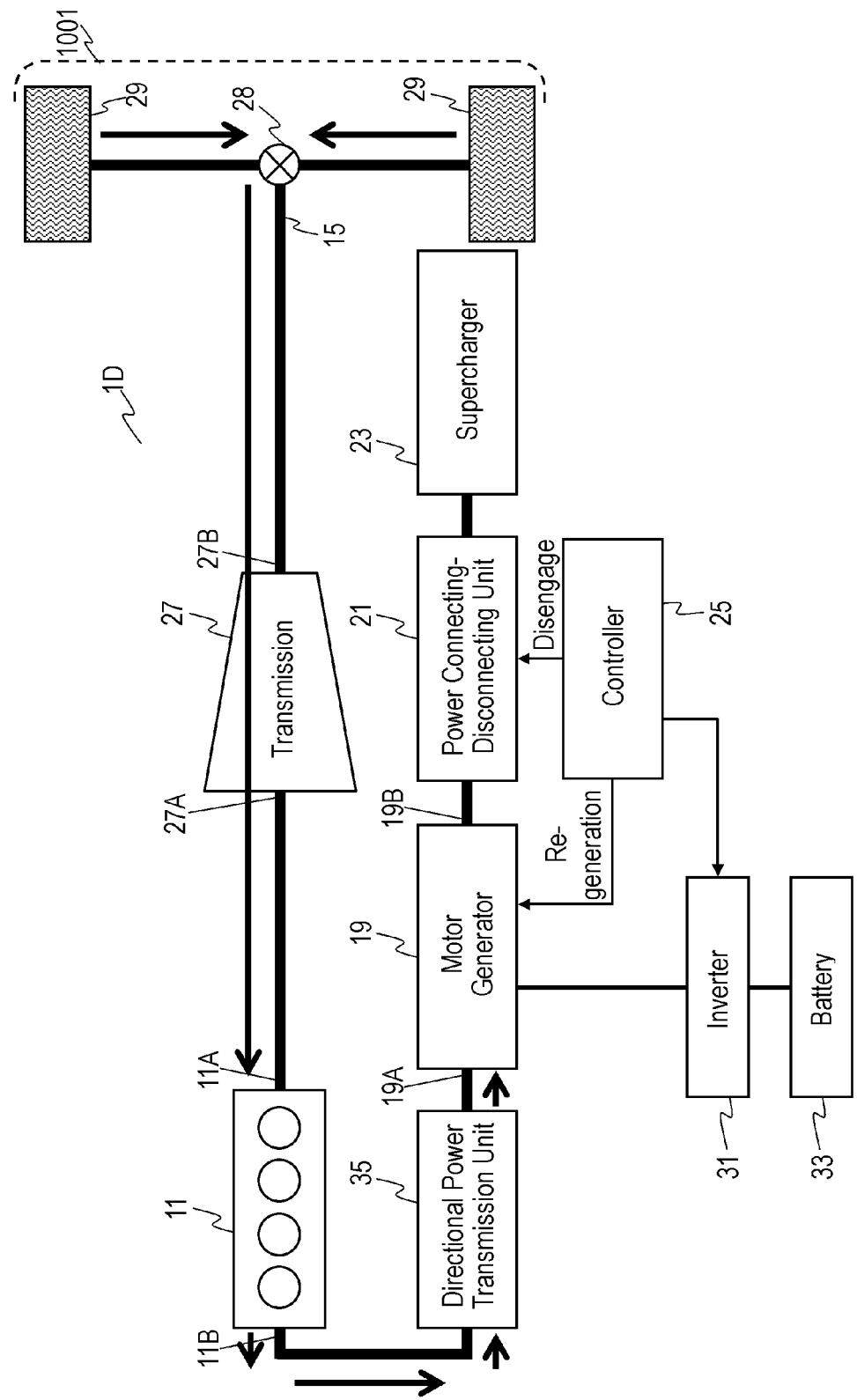
FIG. 15 is a schematic diagram of the vehicle drive device in accordance with Embodiment 4 for illustrating an operation of the vehicle drive device for performing regeneration.
Figure 16:
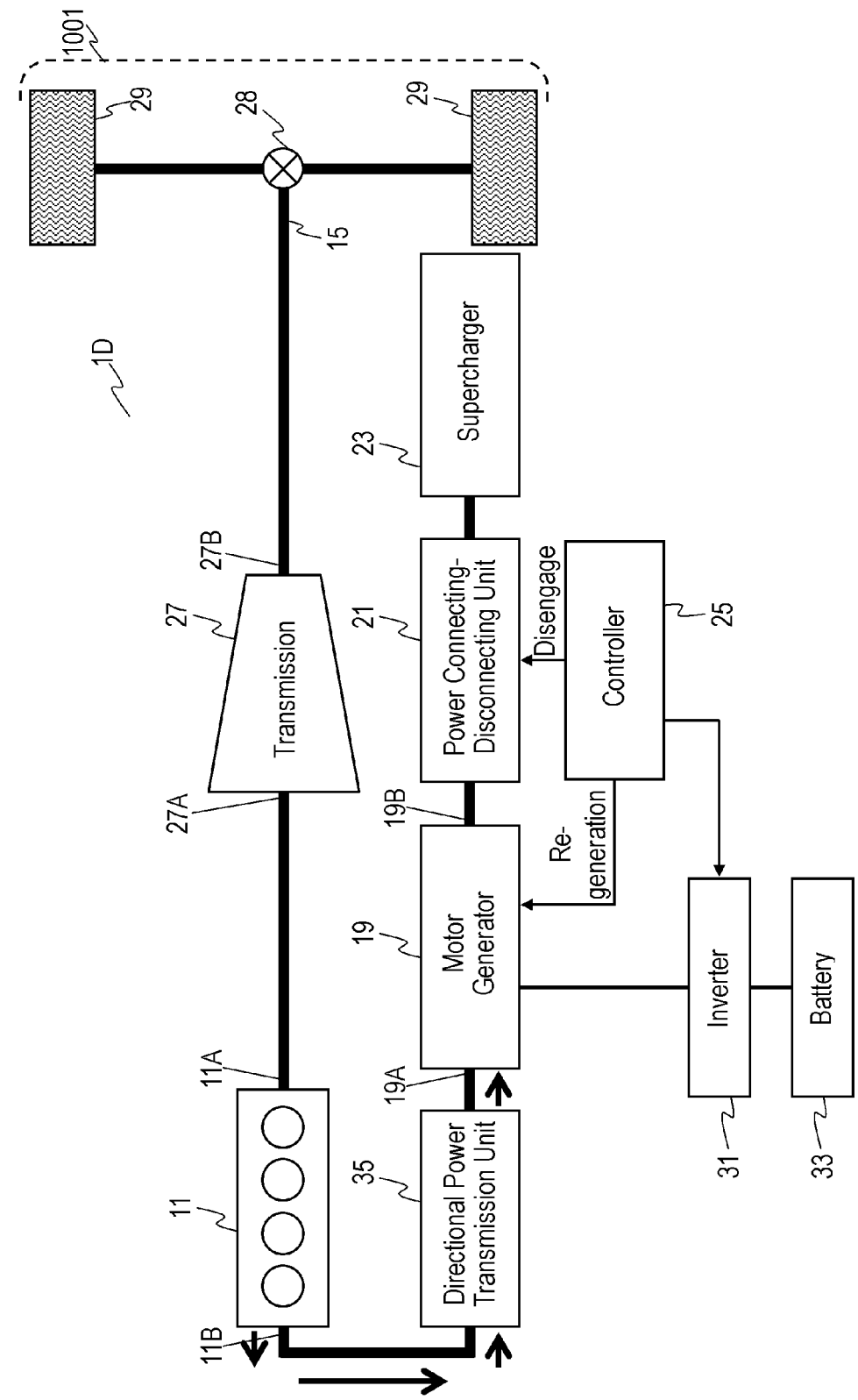
FIG. 16 is a schematic diagram of the vehicle drive device in accordance with Embodiment 4 for illustrating an operation of the vehicle drive device when an engine generates electric power while a vehicle is stopped.
Figure 17:
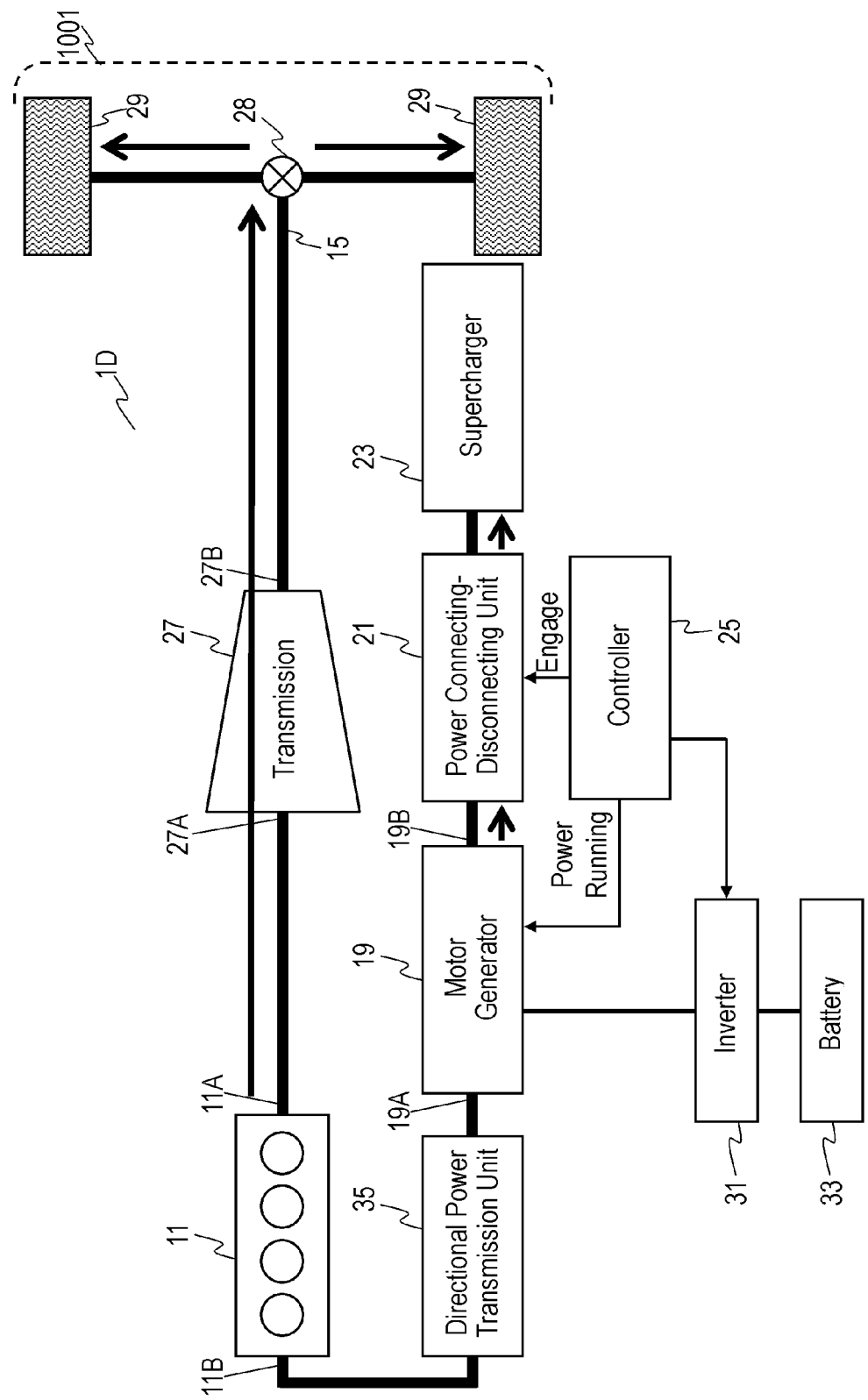
FIG. 17 is a schematic diagram of the vehicle drive device in accordance with Embodiment 4 for illustrating an operation of the vehicle drive device for driving a supercharger.

An operation of vehicle drive device 1D will be described. FIGS. 15 to 17 are schematic diagrams of vehicle drive device 1D for the operation thereof. Thick arrows shown in FIGS. 15 to 17 denote directions in which driving force is transmitted.

First, an operation when vehicle 1001 is decelerated will be described with referring to FIG. 15. When vehicle 1001 is decelerated, deceleration energy which is kinetic energy generated by inertia running of vehicle 101 is transmitted from drive shaft 15 to engine 11 via transmission 27. In this case, since directional power transmission unit 35 is connected to engine 11, the deceleration energy of drive shaft 15 is transmitted to motor generator 19 via transmission 27 and engine 11. When detecting the deceleration of vehicle 1001, controller 25 disengages power connecting-disconnecting unit 21 immediately, and controls motor generator 19 to generate regenerative electric power. At this moment, controller 25 controls inverter 31 to charge battery 33. Thus, driving force due to the deceleration of engine 11 is transmitted directly to motor generator 19 and can perform regeneration. As a result, the regenerative electric power can be efficiently retrieved into battery 33 without passing through supercharger 23.

An operation when electric energy is generated by engine 11 while vehicle 1001 is stopped will be described with referring to FIG. 16. Since vehicle drive device 1D according to Embodiment 4 cannot start up engine 11 by using motor generator 19, vehicle 1001 does not have stop-idling function.

To prevent electric power remaining in battery 33 from decreasing to a predetermined lower limit value while vehicle 1001 is stopped, controller 25 disengages power connecting-disconnecting unit 21 and controls motor generator 19 to generate regenerative electric power. As a result, driving force of engine 11 is transmitted to motor generator 19 via directional power transmission unit 35, and the driving force allows motor generator 19 to generate electric power. Thus, even while vehicle 1001 is stopped, controller 25 can supply electric power to electrical devices mounted to vehicle 1001 while charging battery 33. This operation provides vehicle drive device 1D capable of securing electric power while vehicle 1001 is stopped.

Next, an operation when supercharger 23 is driven will be described with referring to FIG. 17. When determining that engine 11 is necessary to be supercharged, controller 25 engages power connecting-disconnecting unit 21 and controls motor generator 19 to perform power running. At this moment, controller 25 controls inverter 31 to supply electric power of the battery 33 to motor generator 19. As a result, supercharger 23 is electrically driven by motor generator 19. At this moment, directional power transmission unit 35 cannot transmit driving force from motor generator 19 to the engine 11. This eliminates an operation of disengaging of power connecting-disconnecting unit 17 unlike Embodiment 3. This operation allows engine 11 to run at high output power by a simple structure.

Vehicle drive device 1D according to Embodiment 4 can neither start up engine 11 described above nor perform driving assistance. However, since vehicle drive device 1D includes directional power transmission unit 35, its structure can be simplified. Accordingly, if not necessary to start up engine 11 and perform driving assistance by using motor generator 19, vehicle 1001 may preferably have vehicle drive device 1D according to Embodiment 4 mounted thereto. If being necessary to have these functions, vehicle 1001 may preferably have vehicle drive device 1C according to Embodiment 3 mounted thereto.

The above configuration and operations allow regenerative electric power to be retrieved efficiently even if electric supercharger 23 is provided, and it is not necessary to control directional power transmission unit 35, thus providing vehicle drive device 1D with a simple structure.

INDUSTRIAL APPLICABILITY

A vehicle drive device in accordance with the present invention can retrieve regenerative electric power efficiently, and is useful as a vehicle drive device, especially, for driving a vehicle that uses an engine and a motor generator.

REFERENCE MARKS IN THE DRAWINGS

1A-1D vehicle drive device
11 engine
15 drive shaft
17 power connecting-disconnecting unit (first power connecting-disconnecting unit)
19 motor generator
21 power connecting-disconnecting unit (second power connecting-disconnecting unit)
23 supercharger
25 controller
35 directional power transmission unit

The invention claimed is:
1. A vehicle drive device comprising:
an engine configured to be mounted to a vehicle;
a transmission mechanically connected to a first side of the engine;
a drive shaft mechanically connected to the engine via the transmission to drive the vehicle;
a first power connecting-disconnecting unit mechanically connected to a second side of the engine, the second side of the engine being opposite to the first side of the engine;
a motor generator mechanically connected to the second side of the engine via the first power connecting-disconnecting unit;
a second power connecting-disconnecting unit connected to the motor generator;
a supercharger mechanically connected to the motor generator via the second power connecting-disconnecting unit; and
a controller electrically connected to the motor generator and the second power connecting-disconnecting unit,
wherein the first power connecting-disconnecting unit comprises a directional power transmission unit including a one-way clutch or a two-way clutch for transmitting power only to the motor generator from the second side of the engine, and
wherein the controller is configured to:
when the vehicle is decelerated or when electric power is generated by the engine while the vehicle is stopped, disengage the second power connecting-disconnecting unit and allow the motor generator to perform regeneration; and
when the engine is supercharged, engage the second power connecting-disconnecting unit and allow the motor generator to perform power running.

* * * * *